United States Patent [19]

Tsunoda et al.

[11] Patent Number: 4,951,716
[45] Date of Patent: Aug. 28, 1990

[54] LOCKING MECHANISM

[75] Inventors: Mitsunori Tsunoda; Norihiro Yoneyama, both of Toyota, Japan

[73] Assignee: Yazaki Corporation, Tokyo, Japan

[21] Appl. No.: 279,021

[22] Filed: Dec. 2, 1988

[30] Foreign Application Priority Data

Dec. 17, 1987 [JP] Japan .................. 62-190648[U]

[51] Int. Cl.[5] .................................................. F16L 9/22
[52] U.S. Cl. ................................. 138/162; 138/92; 138/157; 138/166; 174/68.3; 174/101
[58] Field of Search ............... 138/162, 166, 168, 157, 138/92; 174/68.3, 101

[56] References Cited

U.S. PATENT DOCUMENTS

| | | | |
|---|---|---|---|
| 450,142 | 4/1891 | Davidson et al. | 138/166 |
| 1,673,642 | 6/1928 | Ruppelt | 138/166 |
| 3,425,456 | 2/1969 | Schibig | 174/68.3 |
| 3,433,270 | 3/1969 | Fischer et al. | 174/101 |
| 3,578,026 | 5/1971 | Meyer | 138/168 |
| 4,015,072 | 3/1977 | Gillemot | 138/166 |
| 4,589,449 | 5/1986 | Bramwell | 138/162 |
| 4,667,702 | 5/1987 | Roth | 138/162 |
| 4,723,349 | 2/1988 | Grimes | 174/101 |

FOREIGN PATENT DOCUMENTS 58-43383 10/1983 Japan .
60-174411 11/1985 Japan .
63-139310 9/1988 Japan .

*Primary Examiner*—James E. Bryant, III
*Attorney, Agent, or Firm*—Venable, Baetjer and Howard

[57] ABSTRACT

A locking mechanism has an engagement hole formed in each side portion of a lid, an engagement projection formed on each side wall of a body for engagement with a corresponding engagement hole, holding plates disposed on a lid portion so as to hold the corresponding engagement projections toward the engagement holes in the adjacent side portions, and projections projecting from the edge surfaces of the respective side walls for engagement with corresponding holes formed in the lid portion. If a force acting to open the lid is externally applied, forces acting to press the engagement projections toward the corresponding engagement holes act upon the edge portions of the respective projections which project from the edge surfaces of the respective side walls of the body. Accordingly, the body and the lid can be made to positively lock into each other.

17 Claims, 3 Drawing Sheets

LOCKING MECHANISM

BACKGROUND OF THE INVENTION

1. Field of the Invention

The present invention relates generally to a locking mechanism suitable for use with a body and a lid which are arranged to lock into each other and, more particularly, to a locking mechanism of the type which is used with a protector for wire harnesses so as to secure the lid of the protector to the body thereof.

2. Description of the Related Art

FIGS. 5 and 6 show a conventional example of such a locking mechanism which is provided in a protector for protecting wire harnesses used for wiring electrical equipment in an automobile or the like. This kind of locking mechanism is described in, for example, the specification of Japanese Utility Model Laid-open No. 13931310-1988. In the figures, a protector body 1 has a bottom la and side walls 1b formed on the opposite sides thereof, forming a U-shaped configuration in cross section, and a space for accommodating a plurality of wire harnesses 7 is formed in the protector body 1. A lid 2 has a lid portion 2a and side portions 2b whose height is small compared with that of the side walls 1b, and forms a U-shaped configuration in cross section. Engagement projections 3 are formed in the vicinity of the engagement edge portion of each of the side walls 1b of the protector body 1, while engagement holes 4 are formed in the lid 2 at locations corresponding to the engagement projections 3 so that the engagement projections 3 can be fit into the corresponding engagement holes 4. The wire harnesses 7 are accommodated in the protector body 1, and the lid 2 is secured to the protector body 1 by a tape 8.

FIG. 5 is a perspective view showing the essential portion of the locking mechanism composed of the engagement projections 3 formed on the protector body 1 and the engagement holes 4 formed in the lid 2. Holding plates 6 are fixed to the lid portion 2a of the lid 2 so as to force the engagement projections 3, formed on the side walls 1b of the protector body 1, toward the corresponding engagement holes 4 by way of the adjacent side walls 1b.

Since such a protector usually accommodates a multiplicity of wire harnesses 7 which are heavy compared with the protector, there is a tendency for a force derived from the weight of the wire harnesses 7 to be applied to locking portions at which the protector body 1 and the lid 2 are engaged with each other. FIG. 6 is a cross-sectional view, taken along line VI—VI of FIG. 5, showing one of the locking portions. As illustrated, if a force as indicated by an arrow F is applied to the lid 2 when the body 1 is engaged with the lid 2, the lid portion 2a and the holding plate 6 tend to be displaced toward the position shown by phantom lines. As a result, a gap is formed at a point A' at which the lid 2 should be kept in contact with the inner edge of the side wall 1b. It follows, therefore, that the engagement projection, 3 of the side wall 1b of the protector body 1 is engaged with the lid 2 at a hook 3' alone. In consequence, it is likely that the engagement projection 3 is disengaged from the engagement hole 4.

To eliminate the likelihood of such disengagement, as shown in FIG. 5, it has been necessary to engage the lid 2 with the protector body 1 and then to fix them by winding the tape 8 therearound.

SUMMARY OF THE INVENTION

It is an object of the present invention to provide a locking mechanism which is capable of eliminating the above-described problems and which can lock a body and a lid in a state wherein they are not easily disengaged from each other.

To achieve the above object, in accordance with the present invention, there is provided a locking mechanism comprising an engagement hole formed in each side portion of a lid, an engagement projection formed on each side wall of a body for engagement with the corresponding engagement hole, holding plates disposed on a lid portion so as to hold the corresponding engagement projections toward the engagement holes in the adjacent side portions, and projections projecting from the edge surfaces of the respective side walls for engagement with corresponding holes formed in the lid portion.

In the arrangement of the present invention, if a force acting to open the lid is externally applied, the surfaces of the respective engagement holes formed in the lid portion act to force the corresponding projecting portions, particularly edge portions of the projections which project from the edge surfaces of the respective side walls of the body, thereby pressing the engagement projections toward the respective engagement holes. Accordingly, the engagement projections are not only engaged with the corresponding engagement holes but also the pressing forces of the engagement holes act upon the corresponding engagement projections by way of the respective side walls of the body. Accordingly, the side walls of the body are positively engaged with the side portions of the lid, respectively.

DESCRIPTION OF THE PREFERRED EMBODIMENT

A preferred embodiment of the present invention will be described below with reference to FIGS. 1 through 4.

Figure 5:
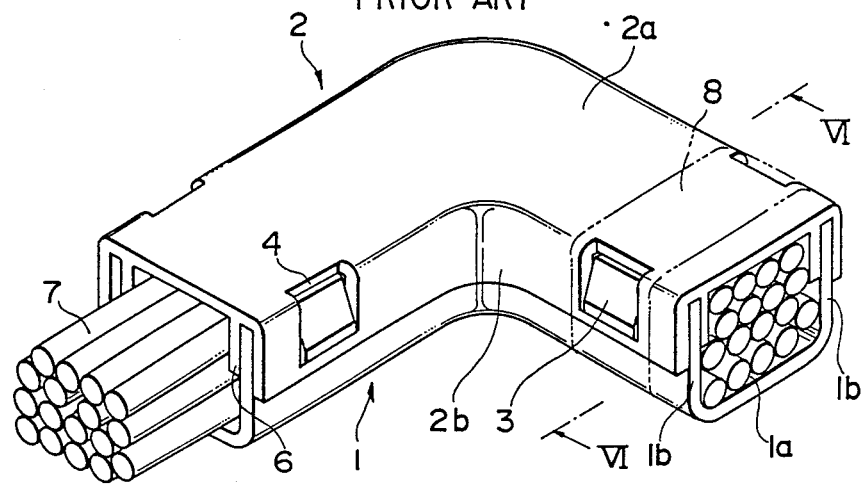
FIG. 5 is a perspective view of a protector provided with a locking mechanism of the conventional type.
Figure 6:
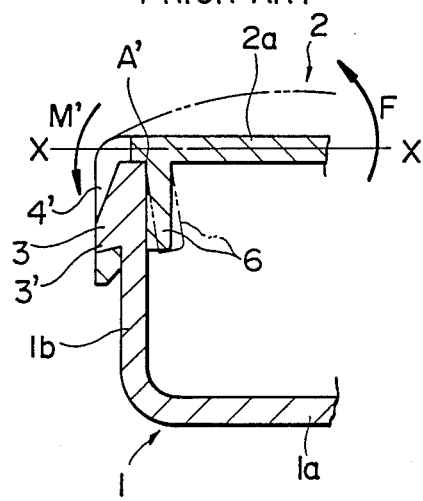
FIG. 6 is a cross-sectional view taken along line VI—VI of FIG. 5.

In the following description, the same reference numerals are used to denote the elements that are the same as shown in FIGS. 5 and 6.

Figure 1:
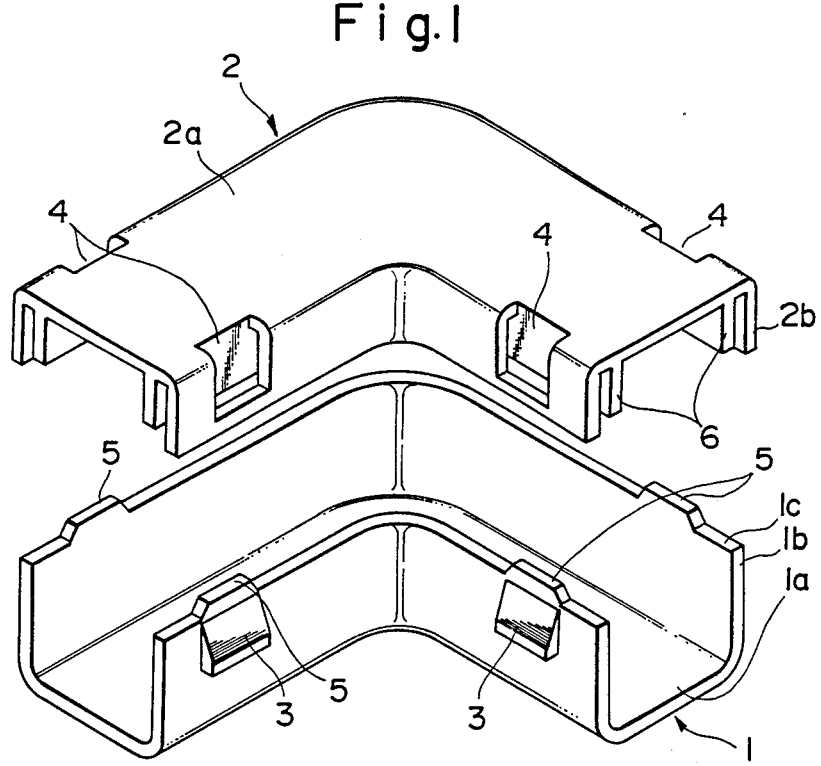
FIG. 1 is an exploded perspective view of the body and lid of a protector to which is applied a locking mechanism according to an embodiment of the present invention.
Figure 2:
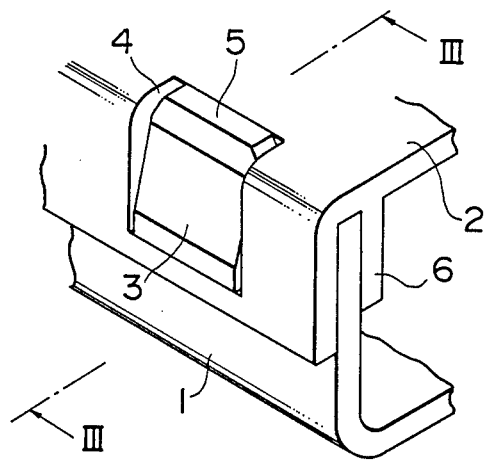
FIG. 2 is a perspective view of a locking mechanism portion of FIG. 1.
Figure 3:
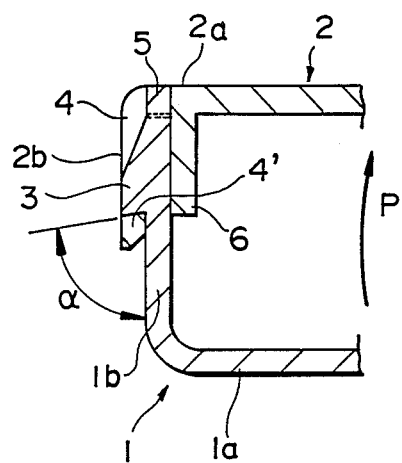
FIG. 3 is a cross-sectional view taken along line III- —III of FIG. 1.

Referring to FIG. 1, a protector body 1 made of a plastic has a bottom la and side walls 1b, and the side walls 1b respectively have edge surfaces 1c which define an opening on the side opposite to the bottom 1a. The edge surfaces 1c serve to form engagement surfaces which provide support for a lid 2 when the lid 2 is engaged with the protector body 1. The lid 2 is, therefore, adapted to engage with the protector body 1, and a locking mechanism is provided for securing the lid 2 to the protector body 1 when they are engaged with each other. As shown in FIGS. 2 and 3 which serve to illustrate a part of the locking mechanism in cross section, an engagement projection 3 is formed on the side of the side wall 1b which engages with the lid 2, and a projection 5 is formed on the edge surface 1c of the side wall 1b. A hole 4 for receiving and engaging with the engagement projection 3 and the projection 5 is formed in a side portion 2b of the lid 2, and a holding plate 6 extends from a lid portion 2a along the side portion 2b. When the protector body 1 is engaged with the lid 2, the holding plate 6 opposes the engagement hole 4 to hold the side wall 1b on which the engagement projection 3 is formed.

Although, in this embodiment, the engagement hole 4 for receiving the engagement projection 3 and the projection 5 is formed as a common hole, separate holes may be formed for the engagement projection 3 and the projection 5, respectively.

As shown in FIGS. 1 to 3, the engagement holes 4 are formed in the side portions 2b of the lid 2, and each of the engagement holes 4 is formed into a rectangular shape which has one side parallel to an inserting direction indicated at P in FIG. 3. Each of the engagement projections 3 formed on the side walls 1b of the protector body 1 has a hook 3' provided with an engagement surface 3", and an engagement surface 4' of each of the engagement holes 4 is adapted to engage with the engagement surface 3" of the corresponding engagement projection 3. As illustrated in FIG. 3, the engagement surface 4' of the engagement hole 4 is formed so as to face in the direction opposite to the inserting direction P, that is, the axis of inclination of the engagement surface 4' crosses the axis of the inserting direction P at an angle of approximately 80° when the lid 2 is engaged with the protector body 1. The engagement surface 4' of the engagement hole 4 is engaged with the corresponding engagement surface 3" of the hook 3' of the engagement projection 3, formed on the side wall 1b, so that the engagement surfaces 4' and 3" lock into each other. Therefore, the engagement surface 3" of each of the engagement projections 3 is likewise formed such that the axis of inclination of the engagement surface 3" crosses the axis of the inserting direction P at a angle of approximately 80°.

Projections 5 project from the edge surface 1c of each of the side walls 1b of the protector body 1. Each of the projections 5 has a plate thickness which is approximately equal to that of the side wall 1b and a width which is approximately equal to that of the engagement hole 4 of the side wall 2b of the lid 2. The height of the projection 5 is at least not less than half the thickness of the lid portion 2a. More particularly, it is desirable that the height of the projection 5 be approximately equal to the thickness of the lid portion 2a.

The operation of the locking mechanism according to the emodiment of the present invention will be described below.

Figure 4:
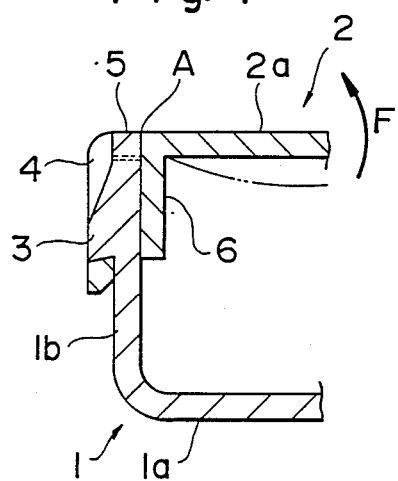
FIG. 4 is a view similar to FIG. 3, and serves to illustrate the function of the locking mechanism according to the embodiment of the present invention.

As shown in FIG. 4, if a force F is applied to the locking mechanism of the invention by means of which the body 1 and the lid 2 are engaged with each other, the engagement hole 4 formed in the lid portion 2a of the lid 2 acts to force an edge A of the projection 5 which projects from the edge surface 1c of the side wall 1b of the body 1, and thereby to press the projection 5 toward the engagement hole 4. As the projection 5 is pressed toward the engagement hole 4, the engagement projection 3 on the side wall of the body 1 is pressed toward the engagement hole 4. In this manner, the engagement projection 3 is not only engaged with the engagement hole 4 at the hook 3' but also the surface of the side wall 1b opposite to the engagement projection 3 is pressed toward the engagement hole 4. Accordingly, the engagement projection 3 is firmly engaged with the engagement hole 4 and it is therefore ensured that a positive locking function can be obtained.

As one example of application of the locking mechanism according to the present invention, a polypropylene protector for wire harnesses was prepared which comprised a protector body having a plate thickness of 1.5 mm, a lid having a plate thickness of 2.0 mm, engagement projections each having a height of 1.4 to 1.5 mm and a width of 12.00 mm, and projections each having a height of 1.5 mm. As compared with the conventional locking mechanism which was not able to bear a load of 10kg, the example of the locking mechanism according to the invention was able to bear a load of a maximum of 14-15 kg. This was an 50% improvement over the load level which could be borne by the conventional locking mechanism. In consequence, it became unnecessary to wind the tape 8 which was necessary in the related art described previously in conjunction with FIG. 5, and the efficiency of assembly working was improved.

What is claimed is:

1. A locking mechanism for securing a lid to a body having a sidewall, the sidewall having a side surface and an edge surface, the locking mechanism comprising:
    a lid having a side portion and a lid portion, said side portion having a first engagement hole and said lid portion having a second engagement hole;
    a first engagement projection extending outwardly from said side surface of said body;
    a second engagement projection extending from said edge surface of said body; and
    a holding plate disposed on said lid;
    whereby said lid is securable to said body by fitting said lid onto said body such that said lid portion is aligned with and supported by said body edge surface, said first engagement hole receives said first engagement projection, said holding plate engages said first engagement projection received within said first engagement hole, and said second engagement hole receives said second engagement projection.

2. A locking mechanism according to claim 1, wherein said second engagement projection extends from said edge surface of said body a distance of at least approximately half the thickness of said lid portion.

3. A locking mechanism according to claim 1, wherein said first engagement hole is provided with a generally rectangular configuration with one side of the rectangular configuration arranged to be substantially parallel to the direction in which said lid is fitted onto said body.

4. A locking mechanism according to claim 1, wherein said first engagement hole and said second engagement hole are integral.

5. A locking mechanism according to claim 4, wherein the width of said first engagement projection is substantially equal to the width of said second engagement projection.

6. A locking mechanism according to claim 1, wherein said first engagement projection includes a hook portion having a surface which faces in a direction generally opposite to the direction in which said lid is fitted onto said body.

7. A locking mechanism according to claim 6, wherein said surface of said hook portion is engageable with an edge of said first engagement hole so as to interlock said hook portion and said first engagement hole when said lid is fitted onto said body.

8. A locking mechanism for securing a lid to a body having a generally U-shaped cross-section with a pair of laterally spaced sidewalls each having a side surface and an edge surface, the locking mechanism comprising:

a lid having at least two side portions and a lid portion, said side portions each having at least one first engagement hole and said lid portion having at least two second engagement holes;

at least one first engagement projection extending outwardly from each of said side surfaces of said body sidewalls;

at least one second engagement projection extending from each of said edge surfaces of said body sidewalls; and a plurality of holding plates disposed along said lid; whereby said lid is securable to said body by fitting said lid onto said body such that said lid portion is aligned with and supported by said body edge surfaces, said first engagement holes receive respective ones of said first engagement projections, said plurality of holding plates engage said first engagement projections received within respective ones of said first engagement holes, and said second engagement holes receive respective ones of said second engagement projections.

9. A locking mechanism according to claim 8, wherein said plurality of holding plates extend along respective ones of said body side walls when said lid is fitted onto said body.

10. A locking mechanism according to claim 8, wherein said second engagement projections extend from respective ones of said body edge surfaces a distance of at least approximately half the thickness of said lid.

11. A locking mechanism according to claim 8, wherein at least one of said first engagement holes is provided with a generally rectangular configuration with one side of the rectangular configuration arranged to be substantially parallel to the direction in which said lid is fitted onto said body.

12. A locking mechanism according to claim 8, wherein at least one of said first engagement holes is formed integral with a corresponding one of said second engagement holes.

13. A locking mechanism according to claim 12, wherein the width of each of said first engagement projections is substantially equal to the width of a corresponding one of said second engagement projections.

14. A locking mechanism according to claim 13, wherein said body and said lid are comprised of plastic.

15. A locking mechanism according to claim 14, wherein said body is a protector for protecting wire harnesses positioned between said body sidewalls, and said lid is engageable with said body to cover said body and retain said wire harnesses within said body.

16. A locking mechanism according to claim 8, wherein each of said first engagement projections is provided with a hook portion having a surface which faces in a direction generally opposite to the direction in which said lid is fitted onto said body.

17. A locking mechanism according to claim 16, wherein said surface of each of said hook portions is engageable with an edge of a corresponding one of said first engagement holes so as to interlock said hook portions and corresponding ones of said first engagement holes when said lid is fitted onto said body.

* * * * *